United States Patent [19]

Kawahara et al.

[11] 4,367,263

[45] Jan. 4, 1983

[54] MAGNETIC RECORDING MEDIUM

[75] Inventors: Hiroshi Kawahara; Tadashi Nishimura; Masatsugu Funakoshi; Masaharu Nishimatsu, all of Tokyo, Japan

[73] Assignee: TDK Electronics Co., Ltd., Tokyo, Japan

[21] Appl. No.: 274,538

[22] Filed: Jun. 17, 1981

Related U.S. Application Data

[63] Continuation of Ser. No. 119,209, Feb. 7, 1980, abandoned.

[30] Foreign Application Priority Data

Feb. 9, 1979 [JP] Japan .................................. 54-13934

[51] Int. Cl.$^3$ ............................................. H01F 10/02
[52] U.S. Cl. .................................... 428/336; 428/469; 428/693; 428/694; 428/900
[58] Field of Search ............... 428/900, 469, 694, 336, 428/693; 427/131; 252/62.54

[56] References Cited

U.S. PATENT DOCUMENTS 4,075,384 2/1978 Suzuki et al. .................... 427/131 X
4,265,931 5/1981 Tamai et al. ......................... 427/131

Primary Examiner—Bernard D. Pianalto
Attorney, Agent, or Firm—Oblon, Fisher, Spivak, McClelland & Maier

[57] ABSTRACT

A magnetic recording medium comprises a first magnetic layer containing magnetite or a cobalt doped magnetite which is coated on a non-magnetic substrate; and a second magnetic layer coating a cobalt doped γ-Fe$_2$O$_3$ which is coated on said first magnetic layer.

The magnetic recording medium has a high recording sensitivity, a high dynamic range, a less output fluctuation and especially superior sensitivity in low frequency band and superior maximum output level without a deterioration of transfer characteristics.

1 Claim, 7 Drawing Figures

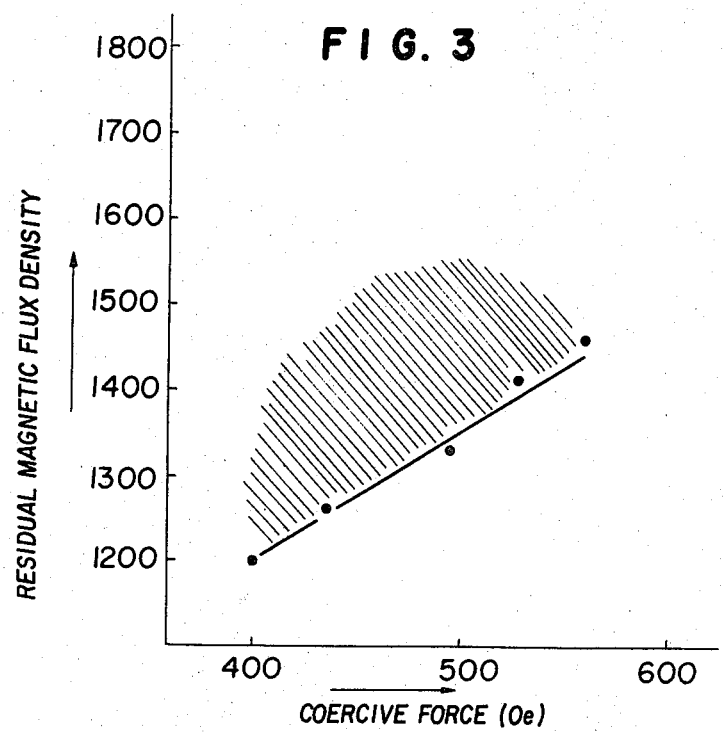
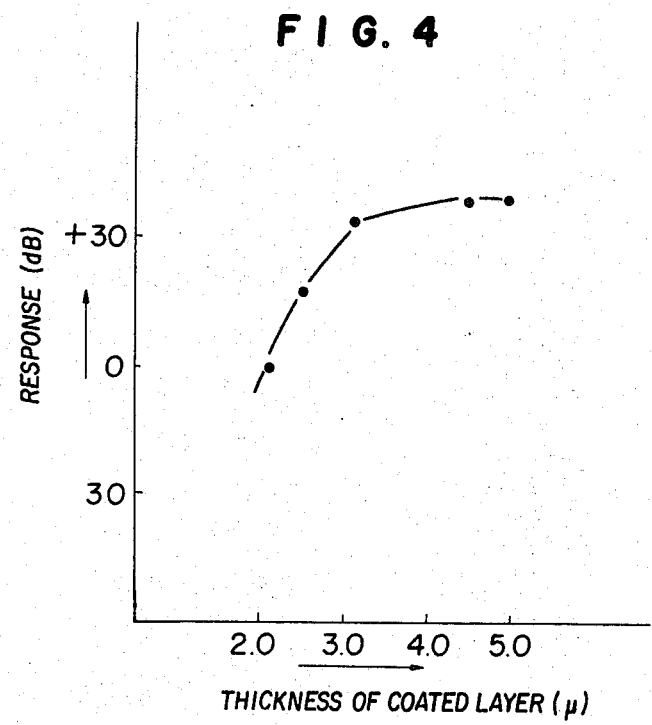

MAGNETIC RECORDING MEDIUM

This is a continuation of application Ser. No. 119,209, filed Feb. 7, 1980 now abandoned.

BACKGROUND OF THE INVENTION

Field of the Invention

The present invention relates to a magnetic recording medium which has excellent high frequency characteristics.

Description of the Prior Arts

A magnetic recording medium having superior high frequency characteristics has been required for an audio cassette tape. It has been required to use a magnetic powder having high coercive force for this purpose. The maximum coercive force obtained by using the conventional ferromagnetic iron oxide is about 400 Oe. A magnetic tape prepared by using chromium dioxide or a cobalt doped magnetic powder having high coercive force has superior characteristics in high frequency band. Therefore, a refreshable equalizer can be used at 70 $\mu$sec. Moreover, the magnetic tape having a broad dynamic range and is advantageous in view of S/N. The casette tape prepared by using chromium dioxide or a cobalt doped magnetic powder has a narrow dynamic range in comparison with an open type magnetic tape. Therefore tone quality in a recording and reproducing has not been satisfactory. The conventional two layer coated tape has excellent characteristics in low frequency band resulted by using a magnetic powder having a low coercive force in the first layer and also has excellent characteristics in high frequency band resulted by using a magnetic powder having high coercive force in the second layer. Therefore, the dynamic range is broad. However, a distortion is caused in a middle frequency band, because a difference between the coercive force in the first layer and the coercive force in the second layer is too large. That is, a middle slump phenomenon is disadvantageously caused. The main components of music are usually in this middle frequency band and a reproduction of an original musical sound is not faithfully given, but a distorted sound is resulted.

When the second layer is coated on the first layer, the thickness of the second layer is usually thinner, the unevenness of the first layer affects to the unevenness of the second layer whereby a fluctuation of an output is disadvantageously increased. In order to obtain minimum characteristics, it is necessary to use a special bias-equalizer. In some decks, such bias-equalizer is equipped, but an optimum bias-equalizer is equipped in only quite small number of the decks.

SUMMARY OF THE INVENTION

It is an object of the present invention to provide a magnetic recording medium which has a high recording sensitivity, a high dynamic range, a less output fluctuation and especially has superior sensitivity in low frequency band superior maximum output level (MOL) without any deterioration of transfer characteristics.

The foregoing and other objects of the present invention have been attained by providing a magnetic recording medium which comprises a first magnetic layer containing magnetite or a cobalt doped magnetite formed on a non-magnetic substrate and a second magnetic layer containing a cobalt doped $\gamma$-Fe$_2$O$_3$ as a magnetic powder formed on said first magnetic layer.

The second magnetic layer preferably has a coercive force of 590 to 800 Oe, a residual magnetic flux density of higher than 1200 gauss and a thickness of 1.5 to 3.0$\mu$.

BRIEF DESCRIPTION OF THE DRAWINGS

FIGS. 1 to 4 show characteristics of a magnetic recording medium of the prior invention proposed by the inventor;

DETAILED DESCRIPTION OF THE PREFERRED EMBODIMENTS

The inventors have proposed a two layer magnetic recording medium which has higher recording sensitivity and superior dynamic range and has less output fluctuation in comparison with the conventional chromium tape or the conventional cobalt doped tape, and which can be used by a normal reproducing equalizer having 70 $\mu$sec. without using a special bias-equalizer and can be used by a chromium bias having superior S/N than that of the normal bias.

The proposed magnetic recording medium has the first layer containing $\gamma$-Fe$_2$O$_3$, cobalt doped Fe$_2$O$_3$ and $\gamma$-Fe$_3$O$_4$ which has high coercive force being 100 to 200 Oe higher than the coercive force of the conventional two layer tape, and the second layer containing a cobalt doped magnetic powder, and has the specific coercive force, the specific residual magnetic flux density and the specific coated layers to have excellent frequency characteristics so as to be used on the conventional chromium position deck and has a less distortion in the middle frequency band and has a less output fluctuation.

The proposed magnetic medium will be described in detail.

Figure 1:
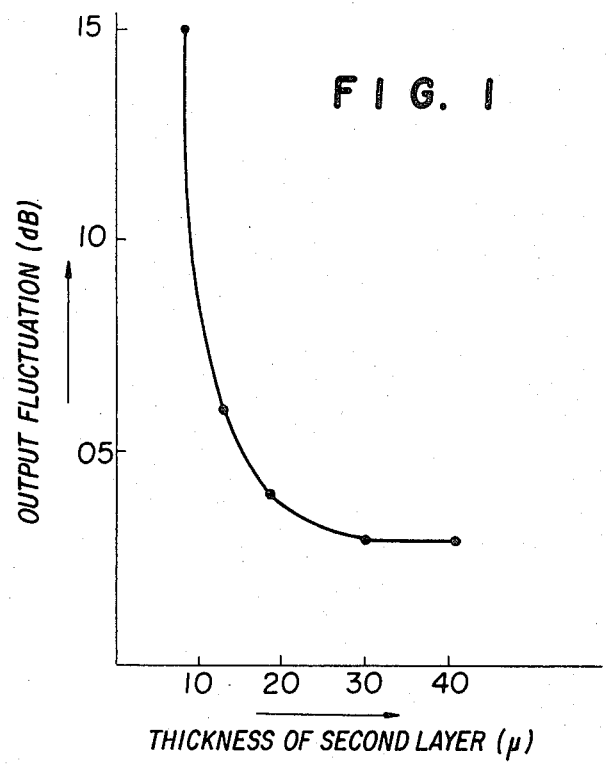

FIG. 1 shows output fluctuations at a frequency of 8 KHz in cases having the first layer having a thickness of 5.0$\mu$ and the second layer having different thickness. The components and the ratios of the magnetic powder and the binder etc. used for the preparation are substantially the same as those of Example 1 described below. As it is found in FIG. 1, when a thickness of the second layer is more than 1.5$\mu$, an output fluctuation is less than 0.5 dB to be no trouble in a practical use. When a thickness of the second layer is too thin, an uneven surface is formed on the second layer because of an uneven surface of the first layer caused by swelling the first layer whereby the output fluctuation is too large. Therefore, the affection of the uneven surface of the first layer is reduced by increasing the thickness of the second layer to be thicker than certain thickness whereby the output fluctuation can be smaller.

It has been difficult to increase the thickness of the second layer in the conventional two layer magnetic recording tape, because the coercive force of the second layer is remarkably higher than that of the first layer. When a thickness of the second layer is thick, a distortion is caused in the middle frequency band.

In accordance with the present invention, coercive force of the first layer and the second layer are controlled to increase the residual magnetic flux density (Bγ) of the first layer so that a thickness of the second layer can be increased.

Figure 2:
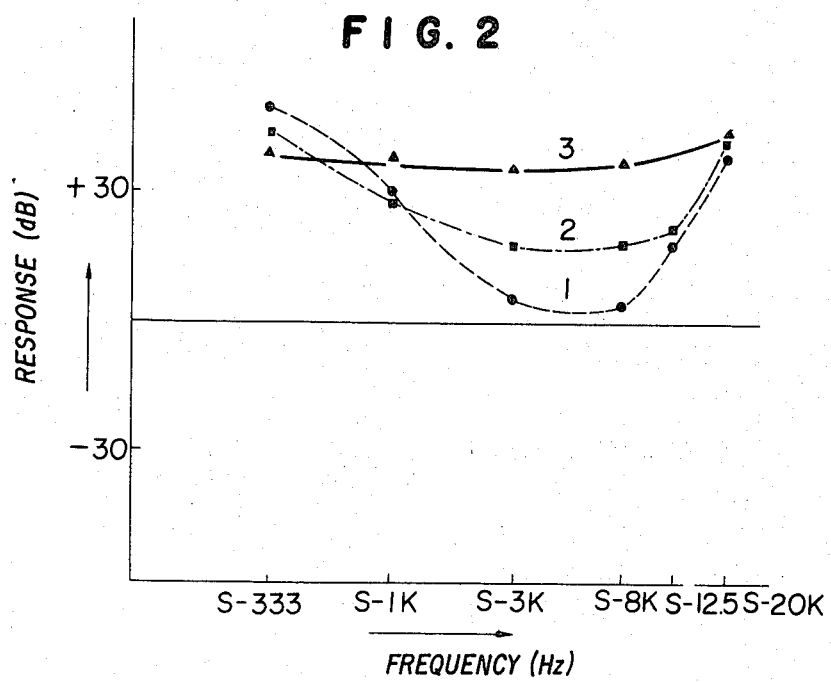

FIG. 2 shows characteristics of response (dB)-frequency (Hz) of samples having the second layer having a coercive force of 710 Oe and the first layer having different coercive force: (Curve 1: a coercive force of 320 Oe; Curve 2: a coercive force of 360 Oe and Curve 3: a coercive force of 400 Oe) which were measured by using a deck of Nakamichi 1000#.

As it is found in FIG. 2, when a coercive force of the first layer is lower, the low frequency sensitivity is higher, but a distortion is caused in the middle frequency band (middle slump) whereas when a coercive force of the first layer is higher, the low frequency characteristic is inferior to be unbalanced one.

The inventors have further studied so as to overcome these disadvantages and have found that the coercive force of the first layer is preferably in a range of 400 to 560 Oe.

It has been found that the distribution of the coercive force becomes broad by mixing magnetic powders having different cercive forces so that a distortion in the middle frequency band can be relatively decreased. It has been found that a distortion in the middle frequency band can be decreased by decreasing the difference between the coercive force of the first layer and the coercive force of the second layer.

The coercive force of the second layer should be higher than 590 Oe so as to give satisfactory characteristics in high frequency band, however it is preferably less than 800 Oe because a trouble is caused in an erasing operation at high coercive force.

The residual magnetic flux density Bγ should be higher than 1200 gauss. When it is lower, the characteristics in high frequency band are inferior even though the coercive force is enough high. The coercive force of the first layer should be higher than certain limit because a distortion in the middle frequency band is prevented. Thus, in order to give high characteristics in the low frequency band with high coercive force, it is necessary to give high residual magnetic flux density Bγ and accordingly, it is necessary to increase a packed density of the magnetic powder.

FIG. 3 shows required saturated residual magnetic flux density Bγ (gauss) to the coercive force (Oe) of the first layer. The saturated residual magnetic flux density Bγ is higher than the equation: $y = 1.60X + 556$ (gauss) wherein X represents a coercive force of the first layer.

When the residual magnetic flux density (Bγ) is less than the limit, the characteristics are inferior because of the sensitivity and the distortion in the middle frequency band.

It is understood from FIG. 3, that Bγ can be 1200 gauss when the coercive force is 400 Oe; and Bγ should be higher than 1350 gauss when the coercive force is 500 Oe. When the packed density is increased to give Bγ of higher than 1800 gauss, the coated layer is too hard. In order to vary Bγ in a constant coercive force, it is controlled by selecting an amount of a dispersing agent.

FIG. 4 shows responses as reproducing output at the frequency of 333 Hz in the case of the first layer having various thickness (μ) and the second layer having a thickness of 2μ.

It is understood, from FIG. 4, that when the thickness of the first layer is lower than 3.0μ, the characteristics are remarkably inferior. However, when the thickness of the first layer is more than 6.0μ, a distortion in the middle frequency band is caused. Therefore, the thickness of the first layer should be in a range of 3.0 to 6.0μ. On the other hand, the thickness of the second layer should be more than 1.5μ in view of the output fluctuation. However, when it is too thick, a distortion in the middle frequency band is caused. Therefore, the thickness of the second layer should be less than 3.0μ and preferably, in a range of 1.5 to 2.5μ.

In accordance with the magnetic recording medium of the present invention, coercives, residual magnetic flux densities. Bγ and thickness of the coated layers of the first and second layers are defined to special ranges, whereby the magnetic recording medium can be used by a conventional cassette deck equipped with a chromium position and has superior characteristics in comparison with the conventional chromium tape, the conventional cobalt doped tape or the conventional two layer tape.

The present invention will be further illustrated by certain examples and references which are provided for purposes of illustration only and are not intended to be limiting the present invention.

EXAMPLE 1

| | |
|---|---|
| Magnetic powder: γ-Fe$_2$O$_3$ | 100 wt. parts |
| Vinyl chloride-vinylidene chloride copolymer | 5 wt. parts |
| Urethane prepolymer | 15 wt. parts |
| Dispersing agent: lecithin | 2 wt. parts |
| Methyl ethyl ketone | 80 wt. parts |
| Methyl isobutyl ketone | 80 wt. parts |
| Toluene | 80 wt. parts |

A mixture of these components was kneaded in a ball mill for 36 hours and 3 wt. parts of a curing agent of isocyanate (Colonate L: manufactured by Nippon Polyurethane K.K.) was admixed to prepare a magnetic composition for the first layer. This was carried on a polyester film to form a layer having a thickness of 4.0μ. The magnetic powder was orientated and the surface was dried and processed and heated at 60° C. for 48 hours to crosslink the polyurethane resin. This is the first layer.

| | |
|---|---|
| Magnetic powder: Cobalt doped γ-Fe$_2$O$_3$ | 100 wt. parts |
| Vinyl chloride-vinylidene chloride copolymer | 10 wt. parts |
| Urethane prepolymer | 20 wt. parts |
| Dispersing agent: lecithin | 1 wt. part |
| Methyl ethyl ketone | 100 wt. parts |
| Methyl isobutyl ketone | 100 wt. parts |
| Toluene | 100 wt. parts |

A mixture of these components was kneaded in a ball mill for 48 hours and 3 wt. parts of a curing agent of isocyanate (Colonate L: manufactured by Nippon Polyurethane K.K.) was admixed. The mixture was coated on the first layer to form a layer having a thickness of 2μ. The magnetic powder was orientated and the surface was dried and processed and heated at 60° C. for 48 hours to crosslink the polyurethane resin. A magnetic recording tape having two layers was obtained. The resulting tape had a coercive force of 570 Oe, Bγ of 1280 gauss and a total thickness of 5.5μ. The first layer had a coercive force of 430 Oe and Bγ of 1300 gauss.

EXAMPLE 2

| | | |
|---|---|---|
| Magnetic powder: Cobalt doped γ-Fe₂O₃ | 100 | wt. parts |
| Vinyl chloride-vinylidene chloride copolymer | 5 | wt. parts |
| Urethane prepolymer | 15 | wt. parts |
| Dispersing agent: lecithin | 3 | wt. parts |
| Solvent: phosphoric acid ester | 2 | wt. parts |
| Methyl ethyl ketone | 80 | wt. parts |
| Methyl isobutyl ketone | 80 | wt. parts |
| Toluene | 80 | wt. parts |

In accordance with the process of Example 1 except that a mixture of these components was used as the mixture for the first layer, the first and second layers were coated and heat-treated to obtain a magnetic recording tape having two layers. The resulting tape had a coercive force of 610 Oe and Bγ of 1400 gauss. The first layer had a coercive force of 530 Oe and Bγ of 1500 gauss.

Figure 5:
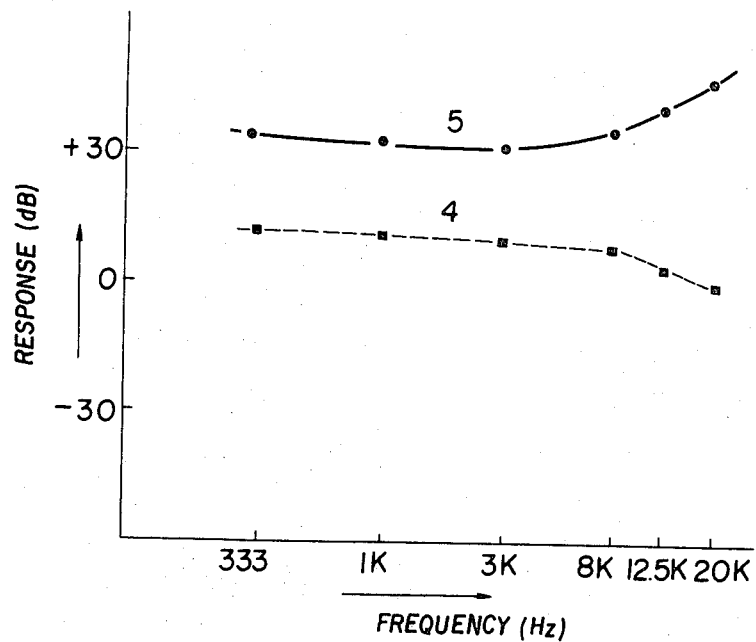
FIG. 5 shows characteristics of the magnetic recording medium of the prior invention and the conventional magnetic recording medium.

FIG. 5 shows frequency characteristics of the magnetic recording tape (Curve 5) and the conventional cobalt doped single layer tape (Curve 4).

As it is clearly understood, the magnetic recording tape of the present invention had superior characteristics in all frequency bands and had broad dynamic range.

EXAMPLE 3

In accordance with the process of Example 1 except using 50 wt. parts of γ-Fe₂O₃ and 50 wt. parts of cobalt doped γ-Fe₂O₃ as the magnetic powder of the first layer, a magnetic recording tape having two layers was prepared. The magnetic recording tape had a coercive force of 580 Oe and Bγ of 1350 gauss. The first layer had a coercive force of 490 Oe and Bγ of 1400 gauss.

In a conventional preparation of a magnetic recording tape having two layers. γ-Fe₂O₃ has been usually used as the magnetic powder of the first layer. Magnetite can be considered as the magnetic powder. However, magnetite has not been usually used because of disadvantages of inferior transfer characteristics though it had high coercive force and accordingly, had superior sensitivity in low frequency band and superior maximum output level (MOL).

The inventors have studied these magnetic recording media and have found that the transfer effect is mainly depending upon the characteristics of the second layer in the magnetic recording tape having two layers and is not substantially affected by the first layer.

In usual, a magnetization is resulted in deeper part of a coated layer by lower frequency so that the transfer characteristic is deteriorated by lower frequency. When the transfer characteristic is measured by a signal having about 1 KHz, the signal for transfer is recorded through the base surface to the next coated layer and accordingly, it is remarkably weaker than the input signal. Therefore, in the magnetic recording tape having two layers, only the second layer (about 2.0μ) is affected by the signal having low frequency whereby it is enough to use a magnetic powder having excellent transfer characteristics only in the second layer.

In the magnetic recording medium having two layers of the present invention, magnetite which has inferior transfer characteristic and has not been substantially used, is used in the first layer (which is not affected) whereby a magnetic recording medium having high magnetization. σs and excellent sensitivity in low frequency band and excellent maximum output level without a deterioration of the transfer characteristic.

REFERENCE:

First layer:

| | | |
|---|---|---|
| Magnetic powder: γ-Fe₂O₃ | 100 | wt. parts |
| Vinyl chloride-vinyl acetate copolymer | 10 | wt. parts |
| Urethane prepolymer | 10 | wt. parts |
| Dispersing agent: lecithin | 3 | wt. parts |
| Methyl ethyl ketone | 80 | wt. parts |
| Methyl isobutyl ketone | 80 | wt. parts |
| Toluene | 80 | wt. parts |

A mixture of these components was kneaded in a ball mill for 48 hours and 3 wt. parts of a curing agent of isocyanate (Colonate L manufactured by Nippon Polyurethane K.K.) was admixed. The mixture was coated on a polyester film to form a layer having a thickness of 40μ. The magnetic powder was orientated and the surface was dried and processed and heated for 48 hours to crosslink the urethane resin.

Second layer:

| | | |
|---|---|---|
| Magnetic powder: cobalt doped γ-Fe₂O₃ | 100 | wt. parts |
| Vinyl chloride-vinyl acetate copolymer | 15 | wt. parts |
| Urethane prepolymer | 5 | wt. parts |
| Dispersing agent: lecithin | 2 | wt. parts |
| Methyl ethyl ketone | 100 | wt. parts |
| Methyl isobutyl ketone | 100 | wt. parts |
| Toluene | 100 | wt. parts |

A mixture of these components was kneaded in a ball mill for 48 hours. The mixture was coated on the first layer to form a layer having a thickness of 2.5μ. The magnetic powder was orientated and the surface was dried and processed.

EXAMPLE 4

| | | |
|---|---|---|
| Magnetic powder: Fe₃O₄ | 100 | wt. parts |
| Vinyl chloride-vinyl acetate copolymer | 10 | wt. parts |
| Urethane prepolymer | 10 | wt. parts |
| Dispersing agent: lecithin | 3 | wt. parts |
| Methyl ethyl ketone | 80 | wt. parts |
| Methyl isobutyl ketone | 80 | wt. parts |
| Toluene | 80 | wt. parts |

In accordance with the process of Reference except that a mixture of these components was used as the mixture for the first layer, the first and second layers were formed.

EXAMPLE 5

| | | |
|---|---|---|
| Magnetic powder: Co doped Fe₃O₄ | 100 | wt. parts |
| Vinyl chloride-vinyl acetate copolymer | 10 | wt. parts |
| Urethane prepolymer | 10 | wt. parts |
| Dispersing agent: phosphoric ester | 3 | wt. parts |
| Methyl ethyl ketone | 80 | wt. parts |
| Methyl isobutyl ketone | 80 | wt. parts |
| Toluene | 80 | wt. parts |

In accordance with the process of Reference except that a mixture of these components was used as the mixture for the first layer, the first and second layers were formed.

Electromagnetic characteristics and transfer characteristics of Reference and Example 4 are shown in Table 1.

TABLE 1

|  |  | Reference | Example 4 |
|---|---|---|---|
| Electromagnetic characteristics (dB) | 333 Hz | +3.1 | +4.1 |
|  | 8 Hz | +3.5 | +4.1 |
|  | 12.5 Hz | +4.3 | +4.5 |
|  | MOL at 333 Hz | +2.5 | +3.5 |
| Transfer characteristic (dB) |  | 56 | 56 |

As it is clearly understood, the magnetic recording tape of the present invention had superior electromagnetic characteristics without deteriorating the transfer characteristics.

Figure 6:
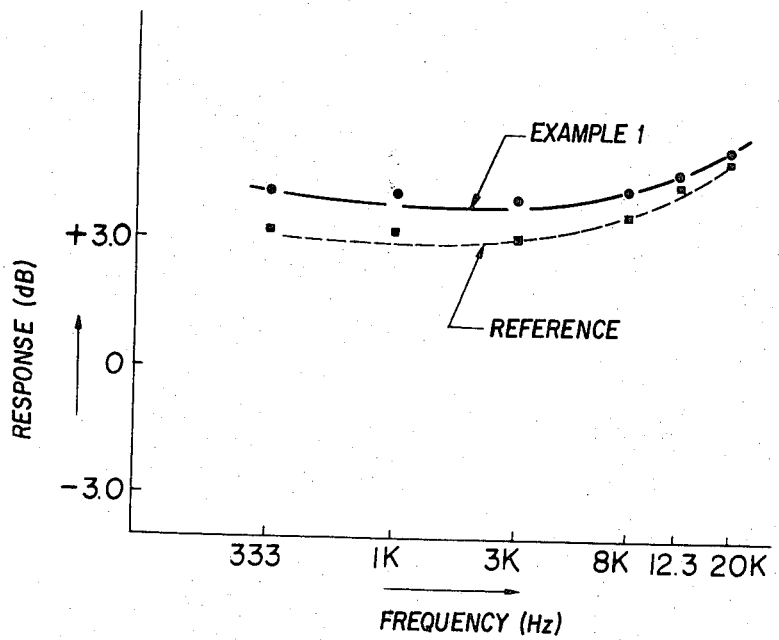
FIG. 6 shows electromagnetic characteristics of one embodiment of the magnetic recording medium of the present invention and the reference.

FIG. 6 shows a graph of the electromagnetic characteristics shown in Table 1.

Figure 7:
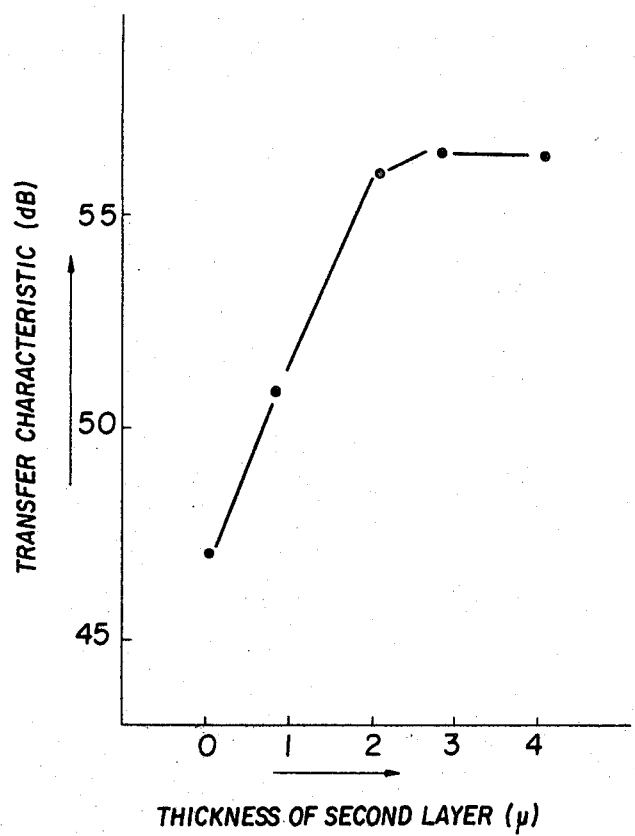
FIG. 7 shows characteristics of the magnetic recording medium of the present invention.

FIG. 7 shows transfer characteristics of samples using magnetite as the magnetic powder in which a thickness of the first layer was constant and a thickness of the second layer was varied.

In the condition of the measurement, each signal having 1 KHz was recorded by an input of +10 dB and each sample was kept 30° C. for 24 hours and the measurement was carried out.

We claim:

1. A magnetic recording medium which comprises: a first magnetic layer containing magnetite, a cobalt doped $\gamma$-$Fe_2O_3$; $\gamma$-$Fe_2O_3$ or a cobalt doped magnetite, which is coated on a non-magnetic substrate and a second magnetic layer containing a cobalt doped $\gamma$-$Fe_2O_3$, which is coated on said first magnetic layer, wherein said first magnetic layer has a thickness of 3.0 to 6.0 microns and a coercive force of 400–560 Oe, and wherein said second magnetic layer has a thickness of 1.5 to 3.0 microns and a coercive force of 590 to 800 Oe, and wherein the residual magnetic flux density is greater than y, wherein $$Y = 1.60X + 556 \text{ (gauss)}$$

and X represents the coercive force of the first magnetic layer.

* * * * *